Feb. 5, 1957  A. M. MAROTH  2,780,098
INDICATING GAUGE RESPONSIVE TO
CIRCULAR OR ANGULAR VELOCITY
Filed July 20, 1955
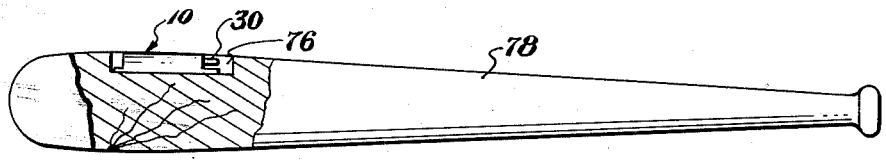
Fig. ~1~
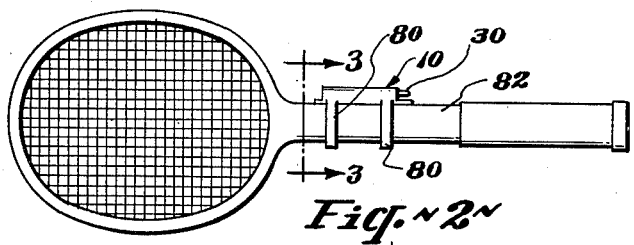
Fig. ~2~
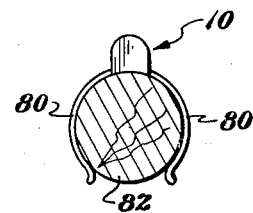
Fig. ~3~
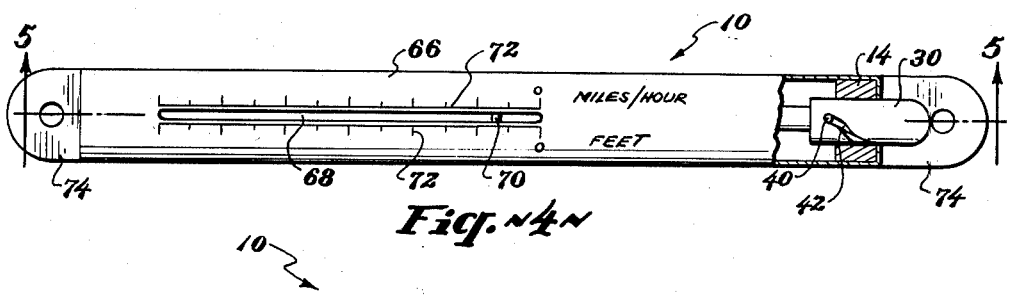
Fig. ~4~
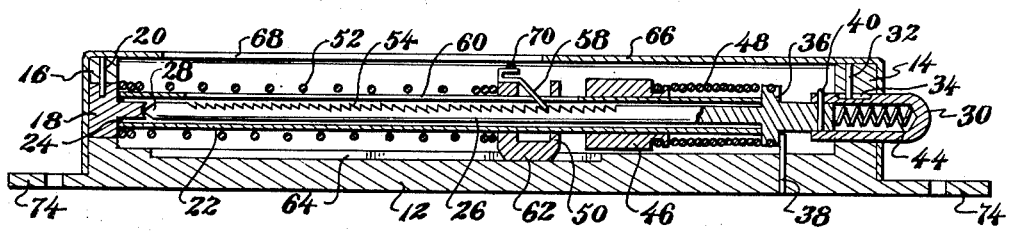
Fig. ~5~
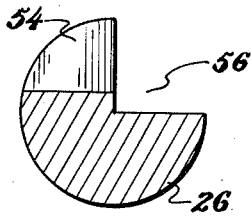
Fig. ~6~
INVENTOR.
ARTHUR M. MAROTH
BY
ATTORNEY.

United States Patent Office 2,780,098
Patented Feb. 5, 1957

2,780,098

INDICATING GAUGE RESPONSIVE TO CIRCULAR OR ANGULAR VELOCITY

Arthur M. Maroth, Wilton, Conn., assignor to Marathon Products, Inc., South Norwalk, Conn., a corporation of Connecticut Application July 20, 1955, Serial No. 523,231

8 Claims. (Cl. 73—380)

The present invention relates generally to gauges responsive to circular or angular velocity, and more particularly is directed to improvements in gauges of that kind for mounting in or on a baseball bat, tennis or badminton racket, golf club or the like to indicate the circular or angular velocity of the hitting stroke, which velocity is a function of the speed and distance of travel of the struck ball or other object.

In an indicating gauge of the described character, a weight or mass is movable by centrifugal force in the direction of the longitudinal axis of the associated baseball bat, racket, golf club or the like, in response to the swinging thereof and drives an indicating member against the force of a return spring. The indicating member cooperates with a suitably calibrated scale to indicate the circular or angular velocity of the swing, or the speed or probable distance traveled by the struck ball or other object, and the indicating member is retained in the position thereof corresponding to the maximum displacement of the mass during the swing until the indicating member is released for return to its original or zero indicating position.

An object of this invention is to provide an improved arrangement in an indicating gauge of the type described above for effecting the return of the indicating member to its original or zero indicating position.

In an indicating gauge embodying this invention, the mass to be acted upon by centrifugal force is slidable along an elongated hollow tube and is urged in the direction opposed to the centrifugal force by a balance spring. The indicating member is also slidable on the hollow tube before the mass and is urged toward the latter by the return spring. The indicating member has a resilient pawl extending therefrom through a longitudinal slot in the hollow tube and is engageable with a ratchet rack formed along only an angular portion of a shaft within the hollow tube, while an adjacent angular portion of the shaft is cut away or recessed along the latter so that, in one angular position of the shaft, the resilient pawl can engage the rack to hold the indicating member at the location of its maximum displacement, and, when the shaft is turned to another angular position in which the cut away or recessed portion of the shaft registers with the pawl, the latter is released and the indicating member is free to be restored to its original or zero indicating position by the associated return spring.

A further feature of an indicating gauge embodying this invention resides in the particular arrangement provided for effecting the angular movement or turning of the ratchet rack bearing shaft between the two above described positions, said arrangements including an axially movable, non-rotatable button or knob having a cam slot therein to receive a pin extending radially from the rotatable, axially fixed shaft, with the button being spring-urged to an extended position which corresponds to the position of the shaft wherein the rack is disposed for engagement by the pawl, so that the release of the pawl from the ratchet rack is achieved merely by manually depressing the button or knob.

The above, and other objects, features and advantages of the invention will be apparent in the following detailed description of illustrative embodiments which is to be read in connection with the accompanying drawing forming a part hereof, and wherein:

Fig. 1 is an elevational view, partly broken away and in section, of a baseball bat having an indicating gauge embodying this invention embedded therein;

Fig. 2 is an elevational view of a tennis racket having an indicating gauge embodying this invention mounted removably on the handle portion thereof;

Fig. 3 is a transverse section taken along the line 3—3 of Fig. 2;

Fig. 4 is an enlarged plan view, partly broken away and in section, of the indicating gauge embodying this invention;

Fig. 5 is a longitudinal sectional view taken along the line 5—5 of Fig. 4; and

Fig. 6 is an enlarged transverse sectional view of a shaft included in the gauge of Figs. 4 and 5.

Referring to the drawing in detail, and initially to Figs. 4, 5 and 6 thereof, an indicating gauge embodying this invention is there illustrated in detail and generally identified by the reference numeral 10. The gauge 10 includes an elongated base 12 having ears 14 and 16 extending therefrom adjacent the opposite ends. A bearing member 18 is received in an opening in the ear 16 and extends inwardly from the latter, and a pin 20 secures the bearing member 18 against rotation within the ear 16.

A hollow tube 22 is mounted at one end on the bearing member 18 and secured to the latter, as by welding 24, to extend parallel to the base 12 toward the ear 14. A shaft 26 extends through the hollow tube 22 and has a conical tip 28 at the end thereof adjacent the ear 16, with the conical tip 28 being rotatably received in a corresponding conical recess in the bearing member 18. At its end remote from the bearing member 18, the shaft 26 extends axially out of the tube 22 and projects into a hollow knob or button 30 which is axially slidable in a suitable opening within the ear 14. A pin 32 is carried by the ear 14 and projects into an axial groove 34 in the knob 30 to prevent rotation of the latter. The shaft 26 has a collar 36 thereon adjacent the end of the tube 22 remote from bearing member 18, and a pin 38 extends from the base 12 and engages the collar 36 at the side of the latter facing toward the ear 14 to prevent axial movement of the shaft 26 in the direction disengaging the tip 28 from the bearing member 18.

A pin 40 extends radially from the end portion of the shaft 26 within the hollow knob 30 and is received in a cam slot 42 (Fig. 4) formed in the latter so that the shaft 26 is turned between two angularly displaced positions in response to axial movement of the knob. The knob 30 is urged axially toward the right, as viewed in Figs. 4 and 5, by a helical compression spring 44 which abuts, at its opposite ends, against the end of shaft 26 and the closed end of knob 30, respectively. Thus, the knob 30 is normally maintained in an extended position, by the spring 44, which corresponds to an operative position of the shaft 26, while the knob may be depressed or pushed toward the left, as viewed in Figs. 4 and 5, to dispose the shaft 26 in a release or return position of the latter.

A weight or mass 46 is slidable axially along the tube 22 and is yieldably urged to the position shown in Fig. 5 by a helical balance spring 48 which is connected, at one end, to the mass 46 and, at the other end, to the collar 36 of shaft 26, so that movement of the mass toward the ear 16 is resisted by the tension of the balance spring.

An indicating member 50 is also axially slidable on the tube 22 and is disposed at the side of the mass 46 facing toward the ear 16 so that, as the mass is displaced toward the left, as viewed in Fig. 5, the mass 46 engages the indicating member 50 and pushes the latter before it. A relatively light helical return spring 52 is disposed on the tube 22 between the bearing member 18 in ear 16 and the indicating member 50 and yieldably urges the latter in the direction toward the mass 46.

As seen in Figs. 5 and 6, the shaft 26 is formed with a ratchet rack 54 along a substantial portion of the length thereof, with the rack 54 extending from only a relatively small angular portion of the shaft and being bounded, at one side, by an elongated cutout or recess 56 (Fig. 6) in the shaft 26 longitudinally coextensive with the ratchet rack. The indicating member 50 has a resilient pawl member 58 extending therefrom through a longitudinal slot 60 in the tube 22 for engagement either with the teeth of the rack 54, as in Fig. 5, or for reception in the recess 56 of the shaft 26, depending upon the angular or rotational position of the latter.

The indicating member 50, while being axially slidable along the tube 22, is held against rotation with respect to the latter by engagement of a portion 62 of the indicating member in a longitudinal groove 64 in the base 12, and the rack 54 and recess 56 of the shaft are so arranged on the shaft 26 that the rack faces toward the slot 60 of tube 22 and is engaged by the pawl 58 when the shaft 26 is in its operative position corresponding to the extended position of the knob 30, and the recess 56 faces toward the slot 60 and receives the pawl 58 when the shaft 26 is turned to its return position by depressing the knob 30.

The illustrated gauge 10 further includes a housing 66 which envelopes the base 12 and the above described elements mounted on the latter and has an opening at one end through which the knob 30 projects. The housing 66 also has an elongated slot 68 or elongated transparent portion extending parallel to the axis of tube 22 and exposing an index member 70 on the indicating member 50. A scale or scales 72 is or are provided on the housing 66 along the elongated slot or transparent portion 68 to cooperate with the index member 70 in indicating the position of the indicating member 50 along the tube 22. Finally, the base 12 may be provided with apertured lugs 74 extending from the opposite ends thereof and by which the gauge may be secured in or on a baseball bat, tennis or badminton racket, golf club or other playing implement that is held adjacent one end and swung against a ball or other object so that the free end of the playing implement follows a more or less circular arc.

The gauge 10 is arranged with the axis of tube 22 extending parallel to the longitudinal axis of the associated playing implement and with the end of the base 12 having the ear 16 thereon being directed toward the free end of the playing implement so that swinging of the latter will give rise to a centrifugal force acting on the mass 46 and causing the latter to move along the tube 22 from the position of Fig. 5 toward the ear 16. The distance that the mass 46 is displaced will obviously depend upon the angular velocity of the swing or stroke which, in turn, is a function of the speed and distance of travel of the ball or other object struck by the playing implement.

When the mass 46 is displaced along tube 22 by the centrifugal force overcoming the opposite force of the balancing spring 48, the indicating member 50 is moved by the mass 46 and, with the shaft 26 in its operative position corresponding to the extended position of the knob 30, the pawl 58 will engage the ratchet rack 54 to hold the indicating member in its position of maximum displacement against the action of the return spring 52. Thus, at the conclusion of a stroke or swing, the index member 70 on the indicating member will cooperate with the scale or scales 72 which may be calibrated to show either the speed of, or the distance that would be travelled by, a ball or object struck by the playing implement moving at the maximum angular velocity of that particular stroke. After the indication provided by the cooperation of index member 70 with scales 72 has been read, the indicating member 50 and its index are returned to its zero indicating position merely by depressing the knob 30 which turns the shaft 26 to its return position where the pawl 58 is released from the ratchet rack and received in the recess 56 to permit the spring 52 to move the indicating member 50 toward the right, as viewed in Fig. 5. When the indicating member has been returned to its zero indicating position, the knob 30 is released and is extended by the spring 44 to restore the shaft 26 to its operative position where the ratchet rack 54 is again engageable by the pawl 58.

As shown in Fig. 1, the indicating gauge 10 is preferably embedded in a recess 76 formed in the playing implement 78 which, in the drawing is illustrated as a baseball bat, but may be any other playing implement used for hitting a ball or other object. However, the indicating gauge 10 embodying this invention may, if desired, be mounted upon the surface of the associated playing implement. For example, as shown in Figs. 2 and 3, spring clips 80 can be provided on the base of the gauge 10 to embrace the handle of a tennis racket 82 or other playing implement.

In addition to the advantageous simplicity of the operation required for effecting the return of the indicating member 50 to its original or zero indicating position, which operation involves only the manipulation of the knob 30 and avoids any necessity for handling of the pawl and ratchet rack, the gauge 10 embodying this invention has other advantages resulting primarily from the provision of an indicating member separate from the weight or mass 46. For example, following a swing or stroke of the associated playing implement, the mass 46 immediately returns to its original position (Fig. 5) under the influence of the relatively strong balance spring 48, while the indicating member 50, which is maintained in the position of maximum displacement by the engagement of pawl 58 with rack 54, is then only acted on by the relatively light return spring 52 so that, upon release of the pawl from the ratchet rack by turning of the shaft 26, the indicating member is gently restored to its original or zero indicating position.

Although an illustrative embodiment of the invention has been described in detail herein and shown in the accompanying drawing by way of example, it is to be understood that the invention is not limited to that precise embodiment and that various changes and modifications may be effected therein without departing from the scope or spirit of the invention as defined in the appended claims.

What is claimed is:

1. An indicating gauge responsive to velocity along an arcuate path and comprising elongated guide means adapted to be radially disposed with respect to the arcuate path, a mass movable along said guide means, resilient balance means yieldably opposing the movement of said mass by centrifugal force in the radially outward direction, an indicating member separate from said mass and also movable along said guide means at the radially outer side of said mass, resilient return means yieldably urging said indicating member radially inward along said guide means, means defining a calibrated scale along said guide means, an index on said indicating member cooperating with said scale so that, when said mass is displaced radially outward by centrifugal force and correspondingly displaces said indicating member, said index and scale show a function of the velocity along an arcuate path causing such centrifugal force, and releasable means for holding said indicating member in its position of maximum radially outward displacement along the guide means.

2. An indicating gauge responsive to velocity along an arcuate path and comprising elongated guide means adapted to be radially disposed with respect to the arcuate path, a mass movable along said guide means, resilient balance means yieldably opposing the movement of said mass by centrifugal force in the radially outward direction, an indicating member separate from said mass and also movable along said guide means at the radially outer side of said mass, resilient return means yieldably urging said indicating member radially inward along said guide means, means defining a calibrated scale along said guide means, an index on said indicating member cooperating with said scale so that, when said mass is displaced radially outward by centrifugal force and correspondingly displaces said indicating member, said index and scale show a function of the velocity along an arcuate path causing such centrifugal force, a pawl on said indicating member, and a ratchet rack extending parallel to said guide means and movable into and out of engagement with said pawl so that, when said ratchet rack is engageable by said pawl, said indicating member is held in its position of maximum radially outward displacement and, thereafter, when said rack is disengaged from said pawl, said indicating member is free to be moved radially inward by said resilient return means.

3. An indicating gauge responsive to velocity along an arcuate path and comprising elongated guide means adapted to be radially disposed with respect to the arcuate path, a mass movable along said guide means, resilient balance means yieldably opposing the movement of said mass by centrifugal force in the radially outward direction, an indicating member separate from said mass and also movable along said guide means at the radially outer side of said mass, resilient return means yieldably urging said indicating member radially inward along said guide means, means defining a calibrated scale along said guide means, an index on said indicating member cooperating with said scale so that, when said mass is displaced radially outward by centrifugal force and correspondingly displaces said indicating member, said index and scale show a function of the velocity along an arcuate path causing such centrifugal force, a pawl on said indicating member, and a shaft extending parallel to said guide means and rotatable about its longitudinal axis, said shaft having a ratchet rack extending therealong over a relatively small angular extent of the shaft and an elongated recess bounding one side of said rack so that, when said shaft is angularly disposed to engage said rack with said pawl, the indicating member is held in its position of maximum radially outward displacement and, thereafter when said shaft is turned to receive said pawl in said recess, the indicating member is free to be returned radially inward by said resilient return means.

4. An indicating gauge responsive to velocity along an arcuate path and comprising elongated guide means adapted to be radially disposed with respect to the arcuate path, a mass movable along said guide means, resilient balance means yieldably opposing the movement of said mass by centrifugal force in the radially outward direction, an indicating member separate from said mass and also movable along said guide means at the radially outer side of said mass, resilient return means yieldably urging said indicating member radially inward along said guide means, means defining a calibrated scale along said guide means, an index on said indicating member cooperating with said scale so that, when said mass is displaced radially outward by centrifugal force and correspondingly displaces said indicating member, said index and scale show a function of the velocity along an arcuate path causing such centrifugal force, a pawl on said indicating member, a shaft extending parallel to said guide means and rotatable about its longitudinal axis, said shaft having a ratchet rack extending therealong over a relatively small angular extent of the shaft and an elongated recess bounding one side of said rack so that, when said shaft is angularly disposed to engage said rack with said pawl, the indicating member is held in its position of maximum radially outward displacement and, thereafter when said shaft is turned to receive said pawl in said recess, the indicating member is free to be returned radially inward by said resilient return means, an axially movable non-rotatable knob, and transmission means between said knob and said shaft operative to convert axial movement of said knob into turning of said shaft.

5. An indicating gauge responsive to velocity along an arcuate path and comprising elongated guide means adapted to be radially disposed with respect to the arcuate path, indicating means movable along said guide means and adapted to be displaced in the radially outward direction by the centrifugal force resulting from movement along an arcuate path, resilient means urging said indicating means radially inward along said guide means, a pawl extending from said indicating means, a shaft rotatable about its longitudinal axis and extending parallel to said guide means, said shaft having a ratchet rack formed along at least a substantal portion of the length thereof over a relatively small angular extent of the shaft and an elongated recess extending along one side of said rack, a non-rotatable knob movable coaxially with respect to said shaft, and pin and cam slot coupling means between said shaft and knob operative to turn the shaft in response to axial movement of said knob so that, in a first axial position of said knob, said rack is engaged by said pawl to hold said indicating means in the position of its maximum radially outward displacement and, in a second axial position of said knob, said pawl is received in said recess of the shaft to free said indicating means for radially inward return movement by said resilient means.

6. An indicating gauge responsive to velocity along an arcuate path and comprising an elongated base adapted to be arranged with its longitudinal axis extending radially with respect to the arcuate path, a hollow tube fixedly mounted on said base parallel to the longitudinal axis of the latter, a shaft rotatably telescoping into said tube and held against axial movement with respect to said base, a mass member slidable on said tube, balance spring means yieldably urging said mass member along said tube in the direction toward the center of the arcuate path, an indicating member slidable on said tube at the side of said mass member facing away from the center of the arcuate path, return spring means yieldably urging said indicating member in the direction toward said mass member so that the latter, when displaced in the radially outward direction by centrifugal force, correspondingly displaces said indicating member, said tube having a longitudinal slot, a pawl extending from said indicating member through said slot, said shaft having a ratchet rack formed along a substantial portion of the length thereof over a relatively small angular extent of the shaft and an elongated recess extending along one side of said rack, and manually actuable means effective to turn said shaft between an operative position, where said rack is engaged by said pawl to hold the indicating means at the position of its maximum radially outward displacement, and a return position, where said pawl is accommodated in said recess to free the indicating member for radially inward return movement by said return spring means.

7. An indicating gauge responsive to velocity along an arcuate path and comprising an elongated base adapted to be arranged with its longitudinal axis extending radially with respect to the arcuate path, a hollow tube fixedly mounted on said base parallel to the longitudinal axis of the latter, a shaft rotatably telescoping into said tube and held against axial movement with respect to said base, a mass member slidable on said tube, balance spring means yieldably urging said mass member along said tube in the direction toward the center of the arcuate path, an indicating member slidable on said tube at the side of said mass member facing away from the center of the arcuate path, return spring means yieldably urging said indicating member in the direction toward said mass member so that the latter, when displaced in the radially outward direction by centrifugal force, correspondingly displaces said indicating member, said tube having a longitudinal slot, a pawl extending from said indicating member through said slot, said shaft having a ratchet rack formed along a substantial portion of the length thereof over a relatively small angular extent of the shaft and an elongated recess extending along one side of said rack, a non-rotatable, axially movable knob mounted on said base co-axially with said shaft, and pin and cam slot coupling means between said shaft and knob operative to turn the shaft in response to axial movement of said knob so that, in a first axial position of said knob, said rack is engaged by said pawl to hold said indicating member in the position of its maximum radially outward displacement and, in a second axial position of said knob, said pawl is accommodated in said recess of the shaft to free said indicating member for radially inward return movement by said return spring means.

8. An indicating gauge responsive to velocity along an arcuate path and comprising elongated guide means adapted to be radially disposed with respect to the arcuate path, a mass member movable along said guide means, resilient balance means yieldably opposing the movement of said mass member by centrifugal force in the radially outward direction, an indicating member separate from said mass member and also movable along said guide means at the radially outer side of said mass member, resilient return means yieldably urging said indicating member toward said mass member, a shaft rotatable about its longitudinal axis and extending parallel to said guide means, said shaft having a ratchet rack formed along a substantial portion of the length thereof over a relatively small angular extent of the shaft and an elongated recess along one side of said rack, a pawl extending from said indicating member, and means effective to turn said shaft between an operative position, where said pawl engages said rack to hold said indicating member in the position of its maximum radially outward displacement along said guide means, and a return position, where said pawl is accommodated in said recess of the shaft to permit radially inward return movement of the indicating member by said return means.

References Cited in the file of this patent

UNITED STATES PATENTS

| 2,101,160 | Weber | Dec. 7, 1937 |
| 2,385,052 | Birk et al. | Sept. 18, 1945 |
| 2,543,722 | Hetzel | Feb. 27, 1951 |

FOREIGN PATENTS

| 179,079 | Great Britain | May 4, 1922 |
| 653,424 | Great Britain | May 16, 1951 |